US008582538B2

(12) United States Patent
Love et al.

(10) Patent No.: US 8,582,538 B2
(45) Date of Patent: Nov. 12, 2013

(54) SCHEDULING GRANT INFORMATION SIGNALING IN WIRELESS COMMUNICATION SYSTEM

(75) Inventors: Robert T Love, Barrington, IL (US); Ravi Kuchibhotla, Gurnee, IL (US); Vijay Nangia, Algonquin, IL (US); Ajit Nimbalker, Arlington Heights, IL (US); Kenneth A Stewart, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/417,478

(22) Filed: Mar. 12, 2012

(65) Prior Publication Data

US 2012/0170541 A1 Jul. 5, 2012

Related U.S. Application Data (63) Continuation of application No. 12/188,053, filed on Aug. 7, 2008, now Pat. No. 8,144,712.

(51) Int. Cl.
*H04B 7/216* (2006.01)

(52) U.S. Cl.
USPC .................. 370/335; 370/395.4; 370/437

(58) Field of Classification Search
USPC ......... 370/310, 315, 316, 319, 321, 322, 328, 370/329, 335, 345, 347, 348, 351, 389, 370/395.1, 395.4, 431, 437, 442, 443; 455/403, 422.1, 450, 462, 464
See application file for complete search history.

(56) References Cited

U.S. PATENT DOCUMENTS

| | | |
|---|---|---|
| 5,862,160 A | 1/1999 | Irvin et al. |
| 6,678,854 B1 | 1/2004 | Irvin |
| 6,738,946 B1 | 5/2004 | Irvin |
| 7,149,538 B2 | 12/2006 | Lindoff et al. |
| 7,289,452 B2 | 10/2007 | Malkamaki |
| 7,298,713 B2 | 11/2007 | Goldberg et al. |
| 7,318,185 B2 | 1/2008 | Khandani et al. |
| 7,453,801 B2 | 11/2008 | Taneja et al. |
| 7,697,483 B2 | 4/2010 | Usuda et al. |
| 7,986,758 B2 | 7/2011 | Lindoff et al. |
| 8,290,088 B2 | 10/2012 | Callard et al. |
| 2002/0194571 A1 | 12/2002 | Parr et al. |
| 2003/0060173 A1 | 3/2003 | Lee et al. |

(Continued)

FOREIGN PATENT DOCUMENTS

| | | |
|---|---|---|
| CN | 1883217 A | 12/2006 |
| EP | 1881662 A1 | 1/2008 |

(Continued)

OTHER PUBLICATIONS

European Patent Office, "Extended Search Report" for European Application No. 12000351.2 Apr. 26, 2012, 5 pages.

(Continued)

*Primary Examiner* — Obaidul Huq (57) ABSTRACT

A wireless user terminal includes a controller communicably coupled to a transceiver. The controller is configured to determine scheduling grant information and additional scheduling grant information from a channel encoded scheduling grant received at the transceiver, wherein the channel encoded scheduling grant includes encoded parity bits combined with the scheduling grant information and the encoded parity bits include the additional scheduling grant information exclusive OR-ed with parity bits obtained from the scheduling grant information.

7 Claims, 4 Drawing Sheets

(56) References Cited

U.S. PATENT DOCUMENTS

| | | | |
|---|---|---|---|
| 2005/0250454 A1 | 11/2005 | Sebire et al. | |
| 2006/0067229 A1 | 3/2006 | Frederiksen | |
| 2006/0285515 A1* | 12/2006 | Julian et al. | 370/328 |
| 2007/0025454 A1 | 2/2007 | Jones et al. | |
| 2007/0195809 A1 | 8/2007 | Blanz et al. | |
| 2008/0146242 A1 | 6/2008 | Alanara et al. | |
| 2008/0192872 A1 | 8/2008 | Lindoff | |
| 2008/0279460 A1 | 11/2008 | Kasahara et al. | |
| 2008/0285512 A1 | 11/2008 | Pan et al. | |
| 2009/0037797 A1 | 2/2009 | Spencer et al. | |
| 2009/0122776 A1* | 5/2009 | Folkstedt et al. | 370/342 |
| 2009/0149207 A1 | 6/2009 | Zhang et al. | |
| 2009/0176463 A1 | 7/2009 | Raaf et al. | |
| 2009/0197630 A1 | 8/2009 | Ahn et al. | |
| 2009/0221293 A1 | 9/2009 | Petrovic et al. | |
| 2009/0245194 A1* | 10/2009 | Damnjanovic et al. | 370/329 |
| 2009/0262854 A1 | 10/2009 | Lee et al. | |
| 2009/0276684 A1 | 11/2009 | Stewart et al. | |
| 2009/0325589 A1 | 12/2009 | Michel et al. | |
| 2010/0238875 A1* | 9/2010 | Sung et al. | 370/329 |
| 2010/0272037 A1* | 10/2010 | Lee et al. | 370/329 |

FOREIGN PATENT DOCUMENTS

| | | |
|---|---|---|
| RU | 2341029 C2 | 5/2008 |
| WO | 0182543 A2 | 11/2001 |
| WO | 2005048625 A1 | 5/2005 |
| WO | 2005050852 A2 | 6/2005 |
| WO | 2007092245 A2 | 8/2007 |
| WO | 2008024788 A2 | 2/2008 |
| WO | 2009129343 A1 | 10/2009 |

OTHER PUBLICATIONS

3GPP TSG RAN WG1 #52, R1-080869 "Summary of Email Discussion on DL Control Signaling" Ericsson, Sorrento, Italy, Feb. 11-15, 2008, 8 pages.
3GPP TSG RAN WG1 #51bis, R1-080328 "Remaining Issues on RV Signalling for HARQ" Nokia Siemens Networks et al., Sevilla, Spain, Jan. 14-18, 2008, 5 pages.
3GPP TSG RAN WG1 #AH , R1-041072 "HARQ Protocol for HSUPA" Panasonic, Seoul, Korea Sep. 20-24, 2004, 3 pages.
European Patent Office, "Extended Search Report" for European Application No. 12000352.0 Apr. 26, 2012, 5 pages.
3GPP TSG RAN WG1 #51bis Meeting; R1-080586; Sevilla, Spain; Jan. 14-18, 2008; 1 Page.
3GPP TSG RAN WG1 #51 Meeting; R1-074861; Jeju, Korea; Nov. 5-9, 2007; 5 Pages.
3GPP TSG-RAN Meeting #50-bis; R1-073970; Shanghai, China; Oct. 8-12, 2007; 9 Pages.
3GPP TSG RAN1 #53bis.; R1-082333; Warsaw, Poland; Jun. 30-Jul. 4, 2008; 9 Pages.
3GPP TSG RAN1 #48bis; Malta; Mar. 26-30, 2007; Motorola; E-UTRA DL L1/L2 Control Channel Design; R1-071353; 6 pages.
3GPP TSG-RAN WG2 Meeting #61; Sorrento, Italy; Feb. 11-15, 2008; Qualcomm Europe; Allocation of Semi-Persistent Resources; R2-081072; 1 page.
3GPP TSG RAN1 #51; Sevilla, Spain; Jan. 14-18, 2008; Motorola; Antenna Configuration Detection Based on Reference Signal Energy; R1-080434; 12 pages.
3GPP TSG RAN WG1 #52 Meeting; Sorrento, Italy, Feb. 11-15, 2008; Nokia Siemens Networks, Nokia; CRC Mask Selection for PBCH; R1-081073; 8 pages.
3GPP TSG RAN1 #51bis Meeting; Sevilla, Spain; Jan. 14-18, 2008; Nokia Siemens Networks, Nokia, China Mobile, Huawei; Issues with PBCH-based Blind Antenna Configuration Detection; R1-080324; 8 pages.
3GPP TSG RAN WG1 #51bis Meeting; Sevilla, Spain; Jan. 14-18, 2008; Nokia Siemens Networks, Nokia, Panasonic, Texas Instruments, Motorola, Samsung, CMCC, CATT, Ericsson, Nortel, Huawei, LGE; Way Forward on PBCH for FDD and TDD; R1-080586; 2 pages.
3GPP TSG RAN1 #53, Kansas City, USA, May 5-9, 2008, R1-082059, Motorola, "Definitions for DCI Format 1C", 6 pages.
The State Intellectual Property Office of the Pople's Republic of China "Notification of the First Office Action" for Chinese Patent Appliction No. 200980114902.5 dated Jan. 4, 2013, 6 pages.
European Patent Office "European Extended Search Report" for European Patent Application No. 12193643.9 dated Feb. 7, 2013, 7 pages.
European Patent Office "European Extended Search Report" for European Patent Application No. 12193645.4 dated Feb. 7, 2013, 7 pages.
European Patent Office "European Extended Search Report" for European Patent Application No. 12193646.2 dated Feb. 7, 2013, 6 pages.
3GPP TSG RAN WG2 #59bis; R2-074159 "Radio Connection Control IEs" Panasonic; Shanghai, China; Oct. 8-12, 2007; 19 pages.
United States Patent and Trademark Office, "Non-Final Rejection" for U.S. Appl. No. 13/399,020 Dec. 6, 2012, 8 pages.
The Federal Service for Intellectual Property, Patents and Trade Marks, "Decision on Grant Patent for Invention" for Russian Patent Application No. 2011108566/08 dated Jun. 27, 2012, 6 pages.

* cited by examiner

FIG. 1

| TBS (5-BITS) | RV (2-BITS) | | CRC (16-BITS) |
|---|---|---|---|

(PRIOR ART)

SCHEDULING GRANT INFORMATION SIGNALING IN WIRELESS COMMUNICATION SYSTEM

CROSS REFERENCE TO RELATED APPLICATIONS

The present application is a continuation of commonly assigned and co-pending U.S. application Ser. No. 12/188,053 filed on 7 Aug. 2008, the contents of which are incorporated herein by reference and from which benefits are claimed under 35 U.S.C. 120.

FIELD OF THE DISCLOSURE

The present disclosure relates generally to wireless communications and more particularly to the signaling of scheduling grant or assignment information, for example, redundancy version and/or transport block size, in wireless communication systems.

BACKGROUND

In wireless communication systems, it is generally desirable to minimize the number of bits used for scheduling grants and assignments. In $3^{rd}$ Generation Partnership Project (3GPP) Long Term Evolution (LTE) protocol systems, for example, reducing the size of the scheduling assignment used for scheduling Physical Downlink Shared Channel (PDSCH) broadcast control transmissions, including Random Access Channel (RACH), paging (PCH) and Broadcast Control Channel_(BCCH) scheduling would improve efficiency. Currently in 3GPP LTE, 2 redundancy version (RV) bits are needed in the scheduling assignment when scheduling the BCCH but these bits are not used when scheduling the PCH or RACH response. In other scheduling grants and assignments defined for 3GPP LTE, for example, in the current Physical Downlink Control Channel (PDCCH) DCI Format 1A scheduling assignment used for BCCH as well as for PCH and RACH response, 5 bits are required for the transport block size (TBS) indicator. As many as 5 bits are required for the TBS indicator to allow selection of TBS with sufficient granularity. In 3GPP R1-082705, it was proposed to signal 2 bits of the 5-bit BCCH transport block size identifier on SIB-1 and to signal the other 3-bits in the PDCCH DCI Format 1C grant/assignment.

In 3GPP, it is know generally to mask scheduling assignment cyclic redundancy check (CRC) bits to indicate user identification (UEID) and/or to indicate the type of scheduling assignment. For example, whether a DCI Format 1C grant is for Paging, RACH response, or System Information (SI) is indicated implicitly by scrambling the CRC with either the P-RNTI (paging), one of the RA-RNTIs (RACH responses) or the SI-RNTI for System Information Block 1 (SIB1) and System Information-x (SI-x), where x=2, ..., 8.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
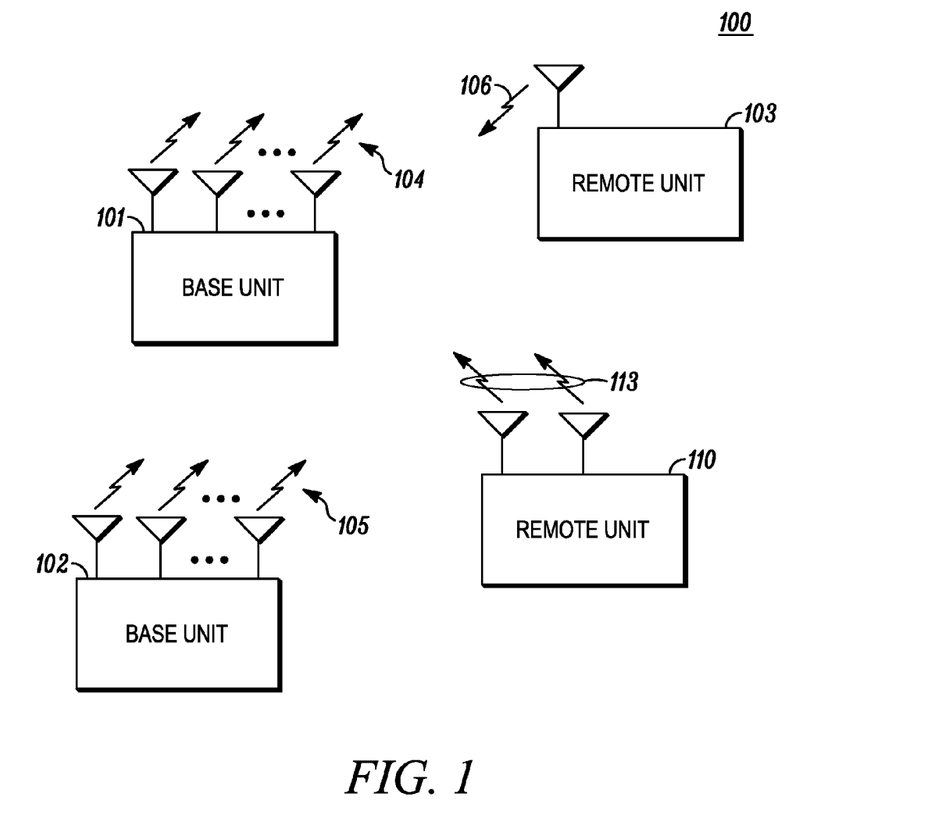
FIG. 1 illustrates a wireless communication system.

In FIG. 1, a wireless communication system 100 comprises one or more fixed base infrastructure units forming a network distributed over a geographical region. The base unit may also be referred to as an access point, access terminal, base, base station, Node-B, eNode-B, eNB, Home Node-B, relay node, or by other terminology used in the art. In FIG. 1, the one or more base units 101 and 102 serve a number of remote units 103 and 110 within a serving area, for example, a cell or a cell sector. The remote units may be fixed units or mobile terminals. The remote units may also be referred to as subscriber units, mobiles, mobile stations, users, terminals, subscriber stations, user equipment (UE), terminals, relays, or by other terminology used in the art.

In FIG. 1, generally, the base units 101 and 102 transmit downlink communication signals 104 and 105 to serve remote units in the time and/or frequency domain. The remote units 103 and 110 communicate with the one or more base units via uplink communication signals 106 and 113. The one or more base units may comprise one or more transmitters and one or more receivers for downlink and uplink transmissions. The remote units may also comprise one or more transmitters and one or more receivers. The base units are generally part of a radio access network that includes one or more controllers communicably coupled to one or more corresponding base units. The access network is generally communicably coupled to one or more core networks, which may be coupled to other networks, like the Internet and public switched telephone networks, among others. These and other elements of the access and core networks are not illustrated but they are known by those having ordinary skill in the art.

In one implementation, the wireless communication system is compliant with the developing Long Term Evolution (LTE) of the 3GPP Universal Mobile Telecommunications System (UMTS) protocol, also referred to as EUTRA, wherein the base station transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol, for example, WiMAX, among other protocols. The present disclosure is not intended to be limited to the implementation of any particular wireless communication system architecture or protocol.

In some systems, for example, EUTRA protocol systems, the base unit performs scheduling functions including the allocation of time and/or frequency and/or spatial resources for data and control communications and the transmission of scheduling assignments. It is generally desirable to minimize the number of bits used for scheduling grants and/or assignments. In this specification, the terms "grant" and "assignment" are used interchangeably. Moreover either term may refer to a grant or assignment made of uplink (UL) and/or downlink (DL).

According to one aspect of the disclosure, the size of a scheduling grant or assignment is reduced, for example, by eliminating or reducing the size of designated bit fields. Information that can no longer be accommodated in designated fields due to the removal of the field or due to a reduction in the size of the field within the scheduling grant is encoded in parity bits associated with the scheduling grant. In one implementation, the parity bits are cyclic redundancy check (CRC) bits or other parity bits.

Figure 2:
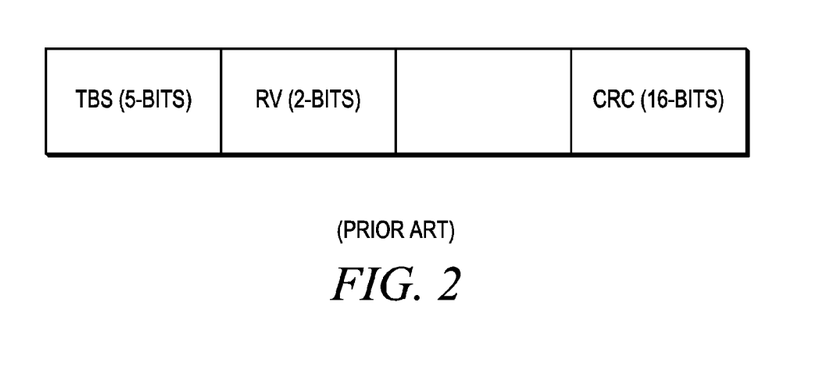
FIG. 2 is a prior art DCI Format 1C scheduling assignment.
Figure 3:
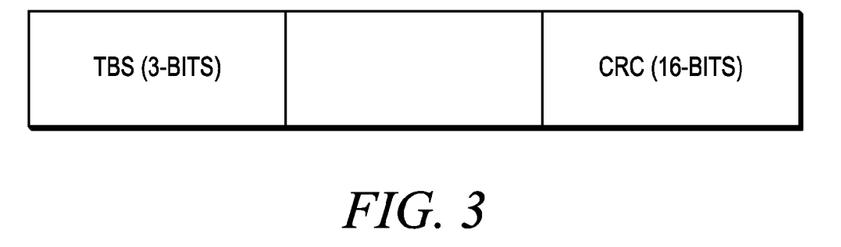
FIG. 3 is a modified DCI Format 1C scheduling grant including scheduling grant information combined with parity bits encoded with additional scheduling grant information.

In one embodiment, the size of the 3GPP LTE DCI Format 1C scheduling assignment is reduced. DCI Format 1C is used for used for scheduling PCH, RACH response and BCCH messages (SIB1 and SI-x, x=2, ..., 8). FIG. 2 illustrates a prior art assignment comprising, among other fields, a 5-bit transport block size (TBS) field for indicating the transport block size, a 2-bit redundancy version (RV) field for indicating the redundancy version and a 16-bit CRC field. FIG. 3 is a modified DCI Format 1C scheduling grant including scheduling grant information (TBS) combined with parity bits (CRC) encoded with additional scheduling grant information. In FIG. 3, the TBS field has been reduced from 5-bits to 3-bits and the RV field has been eliminated. In alternative embodiments, the DCI Format 1C assignment may be modified only by reducing the size of the TBS field or by only removing the RV field, rather than both reducing the size of the TBS field and eliminating the RV field. Alternatively, the size of either or both fields may be reduced or eliminated entirely.

Figure 4:
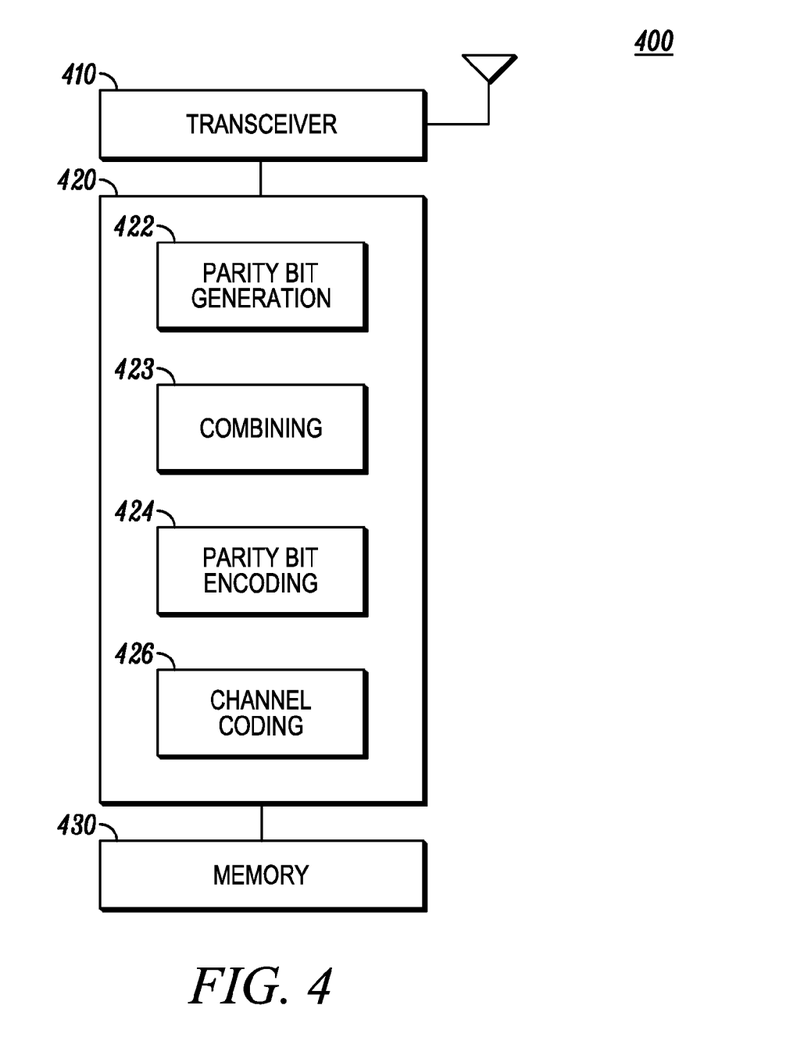
FIG. 4 is a schematic block diagram of a wireless communication infrastructure entity.

In FIG. 4, a wireless communication infrastructure entity 400 comprises a transceiver 410 communicably coupled a controller 420 for communicating with one or more user equipment (UE) within its coverage area. The controller is typically implemented as a digital processor controlled by software and/or firmware stored in memory 430. The controller is thus configured by the software/firmware to perform various functions. Alternatively, however the controller may be implemented as a hardware equivalent device or as a combination of hardware and software.

In one embodiment, the wireless infrastructure entity corresponds to one of the base units of FIG. 1. The base unit includes scheduler functionality for allocating resources to the UE as is known generally.

In FIG. 4, the controller includes parity bit generation functionality 422 that generates parity bits based on UL or DL scheduling grant information that is to be transmitted to a user terminal. Thus under software and/or firmware control, the controller is configured to generate parity bits based on the scheduling grant information. In the process flow diagram 500 of FIG. 5, at 510, the wireless communication network infrastructure entity generates parity bits, for example, cyclic redundancy check (CRC) bits based on scheduling grant information. In FIG. 4, at 423, the parity bits are combined with the scheduling grant information.

In FIG. 4, the controller includes parity bit encoding functionality 424 to implement the encoding of parity bits based on additional scheduling grant information, wherein the additional scheduling grant information is not used to generate the parity bits. The controller, under software and/or firmware control, is thus configured to encode the parity bits based on the additional scheduling grant information not used to generate the parity bits. The order of the operation, namely, parity bit encoding 424 and combining 423 in FIG. 4 may be reversed. Similarly, functionality 530 and 520 in FIG. 5 may be reversed.

In one embodiment, the controller is configured to encode the parity bits by scrambling the parity bits with a unique set of bits corresponding to the additional scheduling grant information not used to generate the parity bits. The unique set of bits is a mask based on a state of the additional scheduling grant information not used to generate the parity bits and based on the parity bits. In one implementation, the controller is configured to perform the scrambling by XOR-ing the parity bits with the mask. The mask could be generated by, for example, selecting 3 length-N masking words, where N is the CRC parity field length with maximum Hamming distance. Such a set of masking words could include, for example, the all-zero or null masking word corresponding to the additional scheduling grant information not used to generate the parity bits. Examples of set of masking words of length N=16 for 4 different redundancy versions are shown in Table 1 and Table 2.

Example Table 1:

| Redundancy Version | mask $<x_0, x_1, \ldots, x_{15}>$ |
|---|---|
| 0 | <0, 0, 0, 0, 0, 0, 0, 0, 0, 0, 0, 0, 0, 0, 0, 0> |
| 1 | <0, 1, 0, 1, 0, 1, 0, 1, 0, 1, 0, 1, 0, 1, 0, 1> |
| 2 | <1, 0, 1, 0, 1, 0, 1, 0, 1, 0, 1, 0, 1, 0, 1, 0> |
| 3 | <1, 1, 1, 1, 1, 1, 1, 1, 1, 1, 1, 1, 1, 1, 1, 1> |

Example Table 2:

| Redundancy Version | mask $<x_0, x_1, \ldots, x_{15}>$ |
|---|---|
| 0 | <0, 0, 0, 0, 0, 0, 0, 0, 0, 0, 0, 0, 0, 0, 0, 0> |
| 1 | <0, 0, 0, 0, 0, 0, 0, 0, 0, 0, 0, 0, 0, 0, 0, 1> |
| 2 | <0, 0, 0, 0, 0, 0, 0, 0, 0, 0, 0, 0, 0, 0, 1, 0> |
| 3 | <0, 0, 0, 0, 0, 0, 0, 0, 0, 0, 0, 0, 0, 0, 1, 1> |

In one application, the additional scheduling grant information not used to generate the parity bits is based on a transport block size (TBS) indicator or based on a portion of a transport block size indicator. In one embodiment where the TBS field has been reduced but not eliminated, the least significant bits of the TBS are communicated expressly in the TBS field and the most significant bits of the TBS form the basis for encoding on the parity bits. Alternatively, the mask used to encode the parity bit is based on an offset into an ordered transport block size list. In 3GPP LTE DCI Format 1C scheduling assignment implementations, for SI-x, the MCS relative index indicates the TBS index relative to a reference TBS. The reference TBS can be implicitly indicated by 2-bits per SI-x transmitted on SIB1. For SIB1, the reference TBS is fixed to the 440 bit TBS.

For BCCH a 2-bit RV is required to indicate the redundancy version of a SIB1 or SI-x transmission. In another embodiment, using the modified DCI Format 1C assignment of FIG. 3, the additional scheduling grant information not used to generate the parity bits is based on the redundancy version (RV) indicator. In 3GPP LTE, the RV bits are not needed in the corresponding DCI Format 1C PDCCH for Paging or RACH response messages as such messages are assumed to be transmitted with RV=0.

In another application, the additional scheduling grant information not used to generate the parity bits is an indicator for a user terminal to include control information on an uplink channel. Examples of control information on an uplink channel include, but are not limited to, ACK/NACK acknowledgment, CQI (channel quality information), RI (Rank Indication), PMI (Precoding Matrix Indicator), Sounding waveform or a combination thereof. In another application, the additional scheduling grant information not used to generate the parity bits is based on user terminal resource allocation information. Examples of user terminal resource allocation information include, but are not limited to, indicating whether frequency hopping is employed, or whether the resource block (RB) allocation is localized (contiguous) or distributed. The user terminal resource allocation information may also include the new data indicator (NDI), which indicates whether the transmission is a first transmission or re-transmission, a CQI request, and Transmit Power Control (TPC) information. The additional scheduling grant information not used to generate the parity bits can also be TDD/FDD specific fields to make the scheduling grants/assignments (approximately) the same size for TDD/FDD for maximum commonality between FDD and TDD, such as TDD specific UL Index or DL assignment index, MSB bits for HARQ process number.

In another embodiment, the additional scheduling grant information not used to generate the parity bits is an indicator of which broadcast control, e.g., paging, transmission number has occurred for the case where the control transmission is repeated one or more times. In another application, the additional scheduling grant information not used to generate the parity bits is an indicator that another control, e.g., paging, transmission may occur in the next sub-frame or some pre-defined future sub-frame possibly without the need for additional scheduling grant.

The scheduling grant information is generally combined or otherwise associated with the encoded parity bits before transmission to the user terminal. In one embodiment, the controller is configured to combine the scheduling grant information and the parity bits by concatenating the parity bits to the scheduling grant information, for example, at the beginning or end thereof. The combining may be performed either before or after the parity bits are encoded. Alternatively, the parity bits may be inserted into a mid portion of information word or the parity bit may be interleaved with the scheduling grant information before or after encoding.

Figure 5:
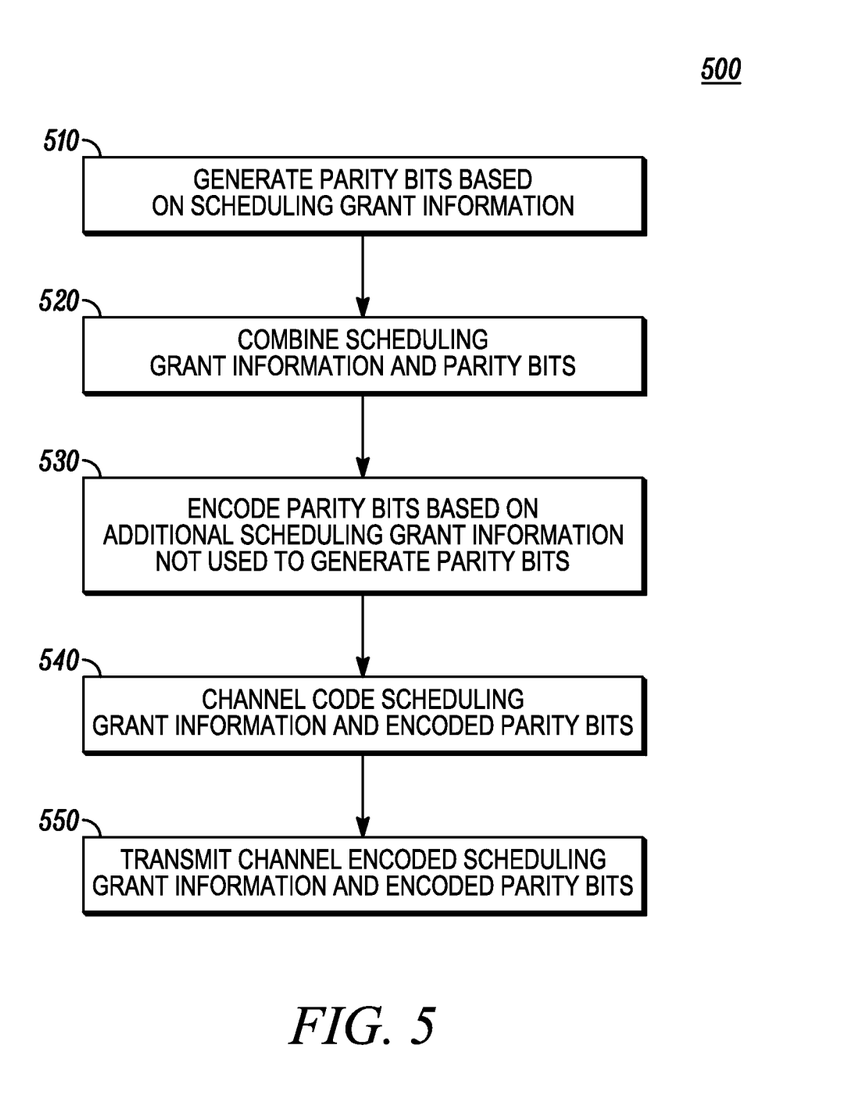
FIG. 5 is a process flow diagram.

In FIG. 5, at block 520, the wireless communication infrastructure entity combines the scheduling grant information and the parity bits and then at 530 the parity bits are encoded based on the additional scheduling grant information not used to generate the parity bits. In an alternative embodiment, the parity bits are encoded before combining with the scheduling grant information. Thus in FIG. 4, the spatial location of the order combining functionality is not necessarily indicative of order in which it occurs relative to the parity bit encoding function. In some embodiments, in FIG. 4, the controller includes channel coding functionality used to channel code the scheduling grant information and the combined encoded parity bits before transmitting. In FIG. 5, at 540, the scheduling grant information combined with the encoded parity bits are channel coded before transmission at 550. In FIG. 4, the controller communicates the channel coded information word and parity bits to the transceiver for transmission.

In some implementations, there would be an increase in the probability that a UE seeking to decode a UE-specific CRC might erroneously correctly decode the BCCH DCI. But this is not significantly worse than if a larger number of UE-specific CRC masks were present. Except for lightly loaded scenarios, there appears little concern that the use of BCCH CRC scrambling would lead to erroneous DCI handling for a unicast UE and hence unicast UE buffer contamination. For the UE seeking to receive the BCCH itself, there is a possibility that it would erroneously decode the RV, but with a good set of RV-dependent masks this also seems controllable. The same class of UE would have an elevated probability of decoding a unicast transmission as a BCCH transmission and contaminate the BCCH combining process. Again, this would not appear to be a major determinant of correct SIB decoding at any reasonable SNR, where PDSCH decoding would dominate. To mitigate the performance loss from soft buffer combining errors due to increased false DCI Format 1C detections, a UE upon detecting a DCI Format 1C grant with TBS different from the current reference TBS for the given SI-x transmission window can ignore the DCI Format 1C grant transmission if the reference TBS has been signaled/detected at least 'x' times from previously detected DCI Format 1C grants in the current SI-x window, or use the TBS of the most recent DCI Format 1C detection as the reference TBS if the UE has not already detected at least 'x' DCI Format 1C grants with another TBS. A suitable value for 'x' is 2. In this case, the UE may flush the soft buffer and reinitializes the buffer with the SI-x transmission corresponding to the most recent DCI Format 1C detection. The TBS from the most recent DCI Format 1C grant becomes the new reference TBS.

In another embodiment, since the size of the SI-x is much smaller compared to possible UE PDSCH data with/without MIMO, the UE can buffer, and possibly soft combine same TBS detected DCI Format 1C grants, from more than one SI-x transmissions with different TB sizes (from previously detected '1C' grants) until a TBS has been indicated on at least 'x' DCI Format 1C detected grants. The UE can then use the TBS indicated on at least 'x' DCI Format 1C detected grants as the reference TBS and the corresponding buffer for future SI-x transmissions in the SI-x window. Thus, DCI Format 1C grants with a TBS different from the reference TBS will be ignored. In an alternate embodiment, more that one buffer can be maintained with different TBS SI-x transmissions and the buffer that decodes correctly (CRC passes) first is considered as a valid SI-x data and passed on to the higher layers. To possibly improve the performance of DCI Format 1C grant detections, bit-fields in the grant/assignment that are reserved or not used, i.e., cannot have a valid value, are set to a known default bit state, for example, 0, which can act as a 'virtual CRC' to reduce false detection rates.

Figure 6:
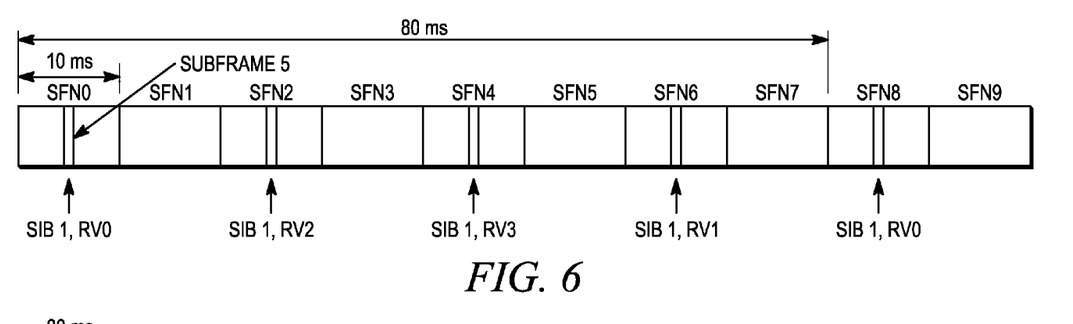
FIG. 6 illustrates SIB1 transmissions in four separate portions every 80 ms on even system frame numbers.

For BCCH a 2-bit RV is required to indicate the redundancy version of a SIB1 or SI-x transmission. The RV can be indicated by scrambling the CRC based on the 2 RV bits as discussed above. The RV bits are not needed in the corresponding DCI Format 1C PDCCH for Paging or RACH response message as such messages are assumed to be transmitted with RV=0. RV bits are not required for SIB1, which is transmitted in four separate portions every 80 ms on even system frame numbers as shown in FIG. 6.

In another embodiment, the Format 1C payload size is reduced by 2-bits by eliminating the RV field. This embodiment takes the total transmission opportunities in a system information (SI) window composed of N sub-frames, e.g., N=40, for a given SI-x (where x=2 . . . 8) and then breaks up the window into K sub-windows where K is the number of Transmissions per SI-x window and where each sub-window is mapped to a redundancy version such that the base station and mobile station always know which redundancy version is used for BCCH transmissions based on the current sub-window. Note that the different SI-x windows do not overlap. Note that the same can be applied to SIB1 also.

According to an alternative embodiment, system frame numbers may be mapped to redundancy versions for SIB1 transmissions. Each SIB portion is associated with not more than one corresponding RV selected from a group. For example, the group may correspond to the sequence: 0; 2; 3; and 1, wherein each frame number is associated with not more than one redundancy version. In one embodiment as shown in FIG. 6, the redundancy versions are mapped to system frame numbers corresponding to frames as follows:

system frame number modulo 8=0 is mapped to RV0;
system frame number modulo 8=2 is mapped to RV2;
system frame number modulo 8=4 is mapped to RV3; and
system frame number modulo 8=6 is mapped to RV1.

According to this alternative mechanism for transmitting the RV, the controller selects one of the four SIB1 portions for transmission wherein the selection is based on the RV corresponding to the frame number of the frame within which the SB1 is to be transmitted.

The modified scheduling grant is received by a wireless user terminal comprising a transceiver communicably coupled to a controller configured to decode the scheduling grant information and additional scheduling grant information from the channel encoded scheduling grant received at the transceiver. The UE controller is also configured to identify the additional scheduling grant information, for example, the TBS and/or RV, encoded on parity bits, as discussed above.

Figure 7:
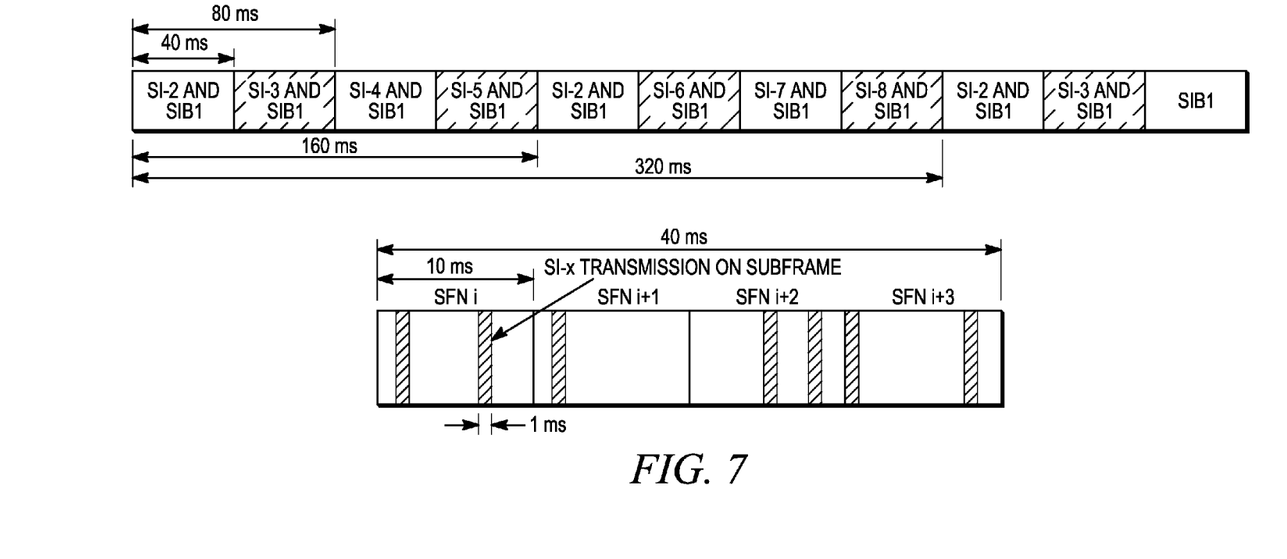
FIG. 7 illustrates SI-x transmissions in a 40 ms transmission window.

According to an alternative embodiment, sub-frame numbers in a SI-x transmission window may be mapped to redundancy versions for SI-x (x=2, . . . 8) transmissions. SI-x may be transmitted in separate portions in a 40 ms interval or transmission window as shown in FIG. 7. The SI-x transmission window for different SI-x may not be overlapping. In a typical System Information-x (SI-x, where x=2 . . . 8) window, the total transmission opportunities are composed of N sub-frames, e.g., N=40. Each SI-x portion is associated with not more than one corresponding RV selected from a group. For example, the group may correspond to the sequence: 0; 2; 3; and 1, wherein each frame number is associated with not more than one redundancy version. In one embodiment, the redundancy versions are mapped to sub-frame numbers corresponding to frames as follows:

sub-frame number modulo 4=0 is mapped to RV0;
sub-frame number modulo 4=1 is mapped to RV2;
sub-frame number modulo 4=2 is mapped to RV3; and
sub-frame number modulo 4=3 is mapped to RV1.

In yet another embodiment, for SI-x transmissions, the redundancy versions are mapped to sub-frame numbers corresponding to frames as follows:

sub-frame number modulo 4=0 is mapped to RV0;
sub-frame number modulo 4=1 is mapped to RV1;
sub-frame number modulo 4=2 is mapped to RV2; and
sub-frame number modulo 4=3 is mapped to RV3.

More generally, for any encoded message the controller of the wireless communication infrastructure entity selects a portion of the encoded message for transmission in a frame of a multi-frame structure. According to this embodiment, the controller selects the portion of the encoded message based on the redundancy version indicator corresponding to the frame number of the frame within which the encoded message is to be transmitted. The frame in which the selected portion of the encoded message is to be transmitted is associated with not more than one redundancy version selected from a group of distinct redundancy versions. The frame number may be a system frame number, as in the example, above, a slot number or a sub-frame number, or a combination thereof.

A wireless user terminal receiving a portion of the encoded message uses the redundancy version to decode the encoded message from the portion received. The wireless user terminal thus comprises a transceiver communicably coupled to a controller configured to determine the redundancy version based on the frame number corresponding to the frame on which the portion of an encoded message was received by the transceiver. The UE controller is also configured to decode the encoded message based on the redundancy version. If the UE is unable to decode the encoded message based on the redundancy version of a first portion of the encoded message, the UE receives another portion of the encoded message.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication infrastructure entity comprising:
   a transceiver; and
   a controller communicably coupled to the transceiver, the controller configured to generate parity bits based on scheduling grant information, the controller configured to encode the parity bits based on additional scheduling grant information not used to generate the parity bits, wherein a frame within which the scheduling grant information is to be transmitted is indicative of the additional scheduling grant information, wherein the frame is part of a multi-frame structure, and wherein the encoded parity bits are combined with the scheduling grant information;
   wherein the controller is further configured to encode the parity bits by scrambling the parity bits with a unique set of bits corresponding to the additional scheduling grant information not used to generate the parity bits;
   wherein the unique set of bits is a mask based on a state of the additional scheduling grant information not used to generate the parity bits; and
   wherein the controller is further configured to perform the scrambling by XOR-ing the parity bits with the mask.

2. The entity of claim 1:
   wherein the wireless communication infrastructure entity is a base station;
   wherein the additional scheduling grant information not used to generate the parity bits is based on a transport block size indicator; and
   wherein the controller is further configured to encode the parity bits by scrambling the parity bits with a unique set of bits corresponding to the additional scheduling grant information not used to generate the parity bits.

3. The entity of claim 2 wherein the controller is further configured to perform the scrambling by XOR-ing the parity bits with the unique set of bits.

4. The entity of claim 1:
   wherein the wireless communication infrastructure entity is a base station;
   wherein the additional scheduling grant information not used to generate the parity bits is based on a redundancy version indicator; and
   wherein the controller is further configured to encode the parity bits by scrambling the parity bits with a unique set of bits corresponding to the additional scheduling grant information not used to generate the parity bits;
   wherein the additional scheduling grant information comprising an element selected from the group consisting of a transport block size indicator, a redundancy version indicator, and an indicator for a user terminal to include control information on an uplink channel.

5. The entity of claim 4 wherein the controller is further configured to perform the scrambling by XOR-ing the parity bits with the unique set of bits.

6. The entity of claim 1:
   wherein the wireless communication infrastructure entity is a base station;
   wherein the additional scheduling grant information not used to generate the parity bits is an indicator for a user terminal to include control information on an uplink channel; and
   wherein the controller is further configured to encode the parity bits by scrambling the parity bits with a unique set of bits corresponding to the additional scheduling grant information not used to generate the parity bits.

7. The entity of claim 1:
   wherein the wireless communication infrastructure entity is a base station;
   wherein the additional scheduling grant information not used to generate the parity bits is based on user terminal resource allocation information; and
   wherein the controller is further configured to encode the parity bits by scrambling the parity bits with a unique set of bits corresponding to the additional scheduling grant information not used to generate the parity bits.

* * * * *